Figure 1:
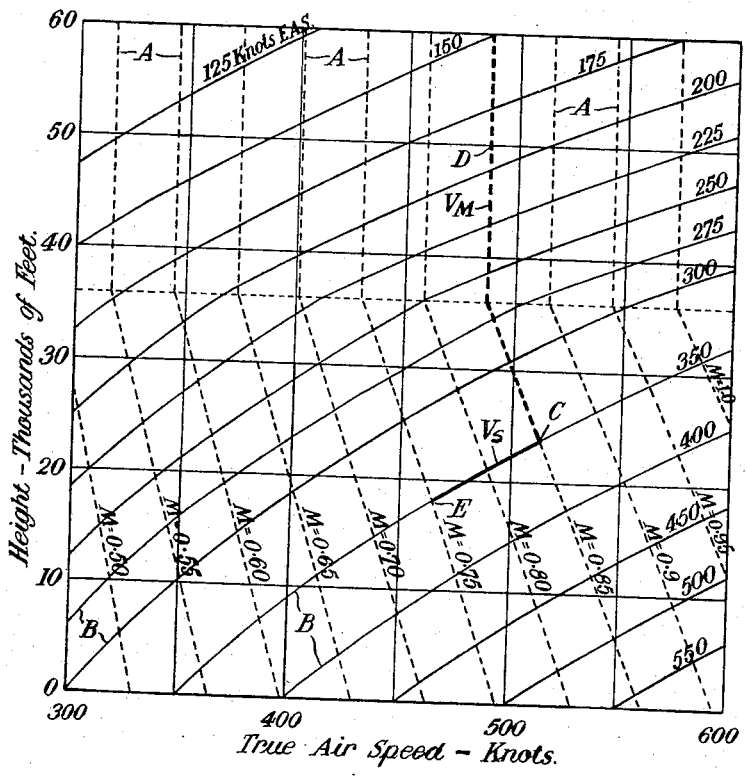

Sept. 16, 1958    D. J. LAMBERT ET AL    2,852,213
AUTOMATIC CONTROL OF AIRCRAFT HAVING PRESSURIZED
CABINS OR THE LIKE
Filed Jan. 9, 1952    3 Sheets-Sheet 1

Sept. 16, 1958　　　　D. J. LAMBERT ET AL　　　2,852,213
AUTOMATIC CONTROL OF AIRCRAFT HAVING PRESSURIZED
　　　　　　　　　　CABINS OR THE LIKE
Filed Jan. 9, 1952　　　　　　　　　　　　　3 Sheets-Sheet 2
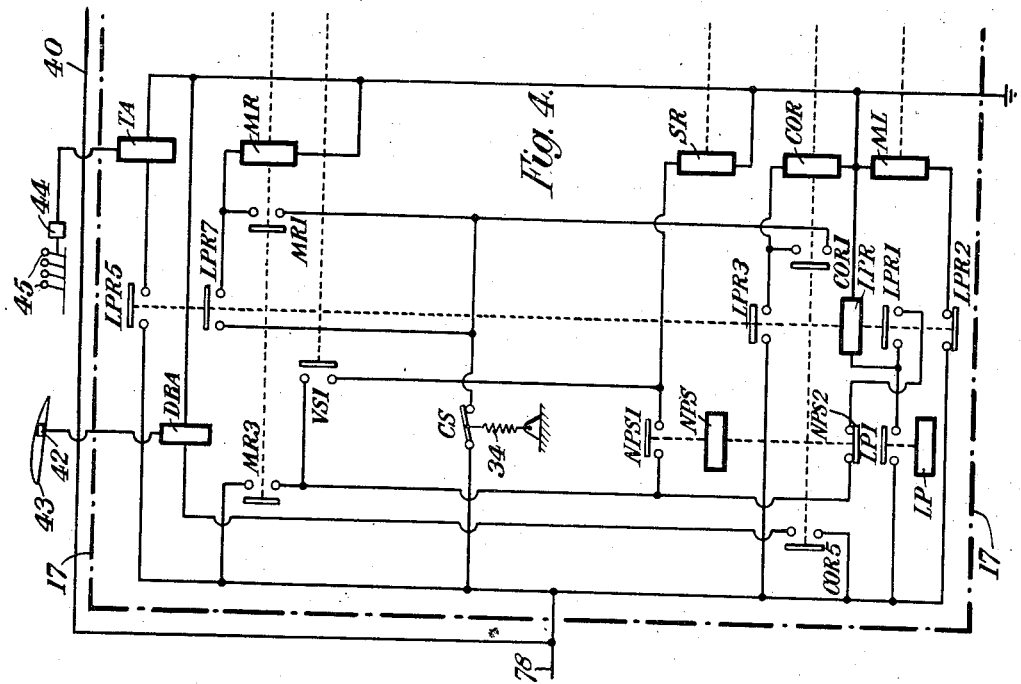
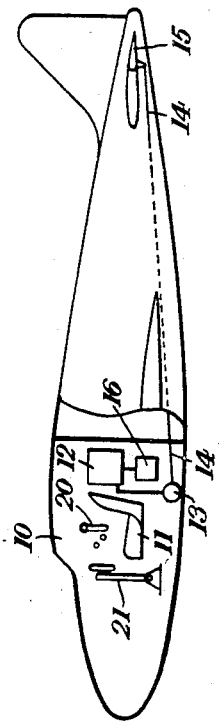
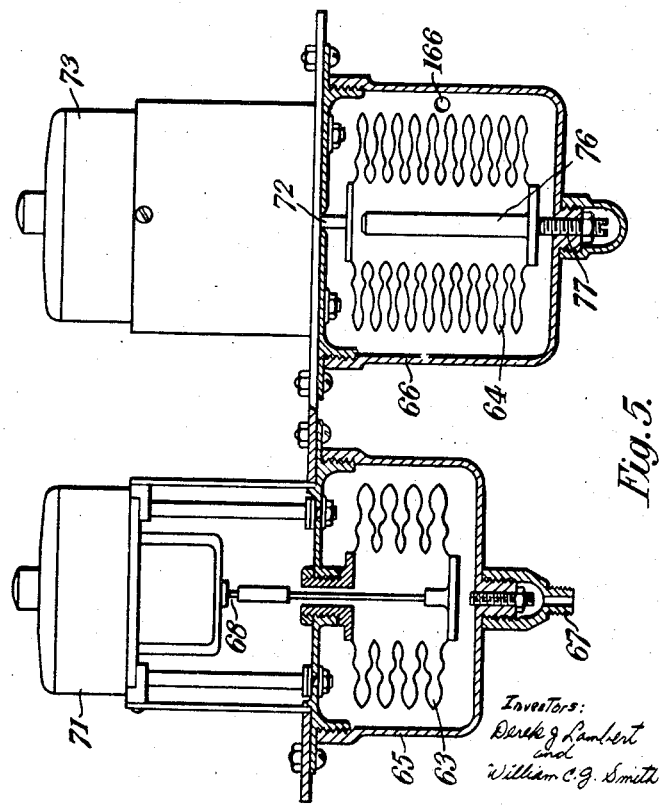
Inventors:
Derek J. Lambert
and
William C. J. Smith
By Watson, Cole, Grindle & Watson
Attys.

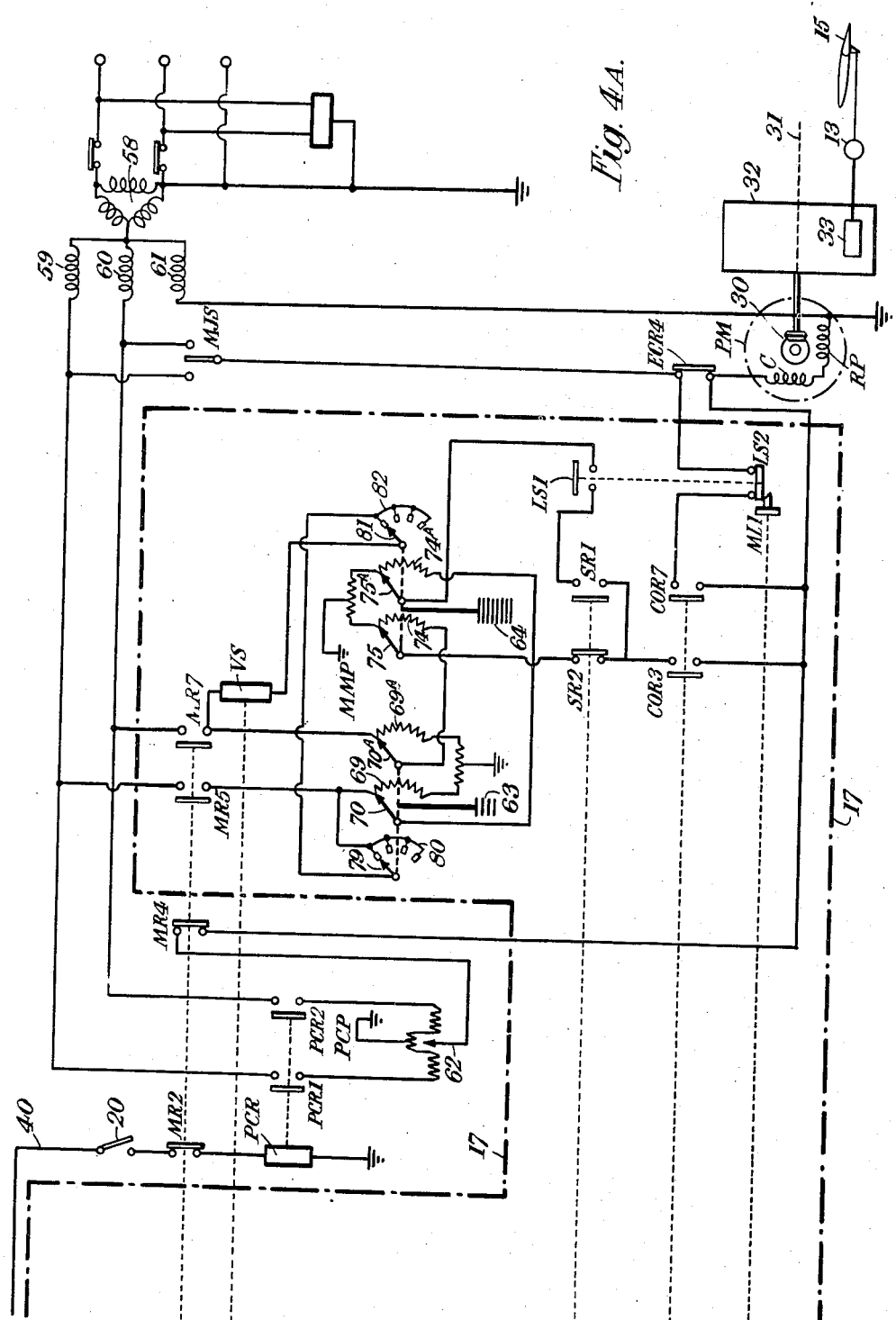

United States Patent Office 2,852,213
Patented Sept. 16, 1958

2,852,213

AUTOMATIC CONTROL OF AIRCRAFT HAVING PRESSURIZED CABINS OR THE LIKE

Derek Joseph Lambert and William Charles George Smith, Weybridge, England, assignors to Vickers-Armstrongs Limited, London, England Application January 9, 1952, Serial No. 265,664

Claims priority, application Great Britain January 17, 1951

8 Claims. (Cl. 244—77)

This invention relates to aircraft fitted with pressure cabins which may fly at altitudes at which human beings would become unconscious due to lack of oxygen if subjected to ambient atmospheric conditions. If a failure of the pressurising system of such an aircraft occurs, survival of the occupants of the cabin may depend upon a rapid rate of descent to lower altitudes at which breathing of the ambient air will support life. Below a certain altitude, herein termed the critical altitude, the critical forward speed, $V_s$, at which any aircraft may safely travel is governed by its structural strength. Above the critical altitude, however, compressibility and like effects become of predominating importance and the aircraft cannot safely be allowed to travel at a forward speed exceeding a value, $V_m$, determined by its aerodynamic behaviour, and it is essential that the aircraft should not be permitted to fly at a Mach number exceeding a critical value characteristic of the aircraft in question. At the critical altitude the two critical speeds $V_s$ and $V_m$ are equal.

The invention aims to provide a system of automatic control which will, without assistance from the pilot, be brought into operation, if the pressurising system fails at a dangerous altitude, to cause the aircraft to dive at a substantially constant Mach number not exceeding the critical value to an altitude at or approximating to the critical altitude and thereafter to continue its dive at a substantially constant equivalent airspeed not exceeding the critical value until a safe altitude is reached, i. e. an altitude at which respiration sufficient for recovery from an unconscious state is possible, and then to return the aircraft to straight and level flight. In this condition, the pilot may recover from any temporary incapacity due to lack of oxygen, and will be able to take over control of the aircraft once more.

The invention accordingly provides an aircraft having a pressure cabin and an automatic pilot, and comprising pressure sensitive means exposed to the pressure within the pressure cabin, normally ineffective mechanism arranged to be operated automatically by the pressure sensitive means, in response to reduction, at an altitude above the critical altitude, of the pressure in the pressure cabin to a given limit, to control the automatic pilot so as to maintain the aircraf in flight at a substanially constant Mach number not exceeding the critical Mach number, means operative automatically, when the aircraft has descended to an altitude at or near to the critical altitude, to modify the action of said mechanism so that thereafter the aircraft is maintained in flight at a substantially constant equivalent airspeed not exceeding the critical equivalent airspeed, and means operative automatically when the aircraft has descended to a safe altitude to remove the control of said mechanism from the automatic pilot.

In the preferred form of the invention we employ a single electrical Mach meter including two pressure sensitive devices, viz. a speed responsive device exposed to dynamic air pressure and an altitude responsive device exposed to atmospheric pressure, a potentiometer system, wipers operated by said pressure sensitive devices and coacting above the critical altitude with the potentiometer system to apply to the elevator control of the automatic pilot, when the mechanism is in operation, a dive signal representative of the Mach number, a stop for arresting further movement of the altitude responsive pressure sensitive device when the aircraft has descended to an altitude at or near to the critical altitude so that the dive signal thereafter applied to said elevator control is representative of the equivalent airspeed, and a switch which is operative automatically, should the Mach number or the equivalent airspeed as the case may be reach the critical value, to apply a temporary climb signal to said elevator control.

Figure 3:
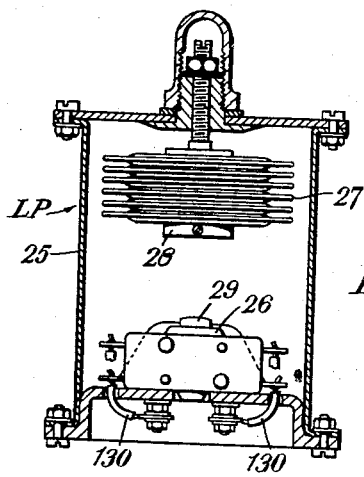

One specific embodiment of the invention will now be described in detail, by way of example, with reference to the accompanying drawings, in which:

Fig. 1 is a series of graphs illustrating the conditions under which the aircraft will descend from a dangerous altitude in the event of failure of the pressurising system, Fig. 2 is a diagram showing an aircraft fitted with the automatic control system according to the invention, Fig. 3 is a vertical section through a pressure switch, Figs. 4 and 4A collectively constitute a circuit diagram showing part of a conventional automatic pilot and, within the frame in the diagram, an electrical Mach meter control, and Figure 5 is an elevation, partly in section, of the electrical Mach meter.

Like reference numerals indicate like parts throughout the figures.

In Fig. 1, the dash lines A indicate lines of constant Mach number M, M being the ratio $$\frac{\text{Aircraft true air speed at a given altitude}}{\text{Speed of sound at that altitude}}$$

The full lines B indicate lines of constant equivalent airspeed (E. A. S.), the equivalent airspeed being defined by the formula $$\text{E. A. S.} = \text{True airspeed} \times \sqrt{\sigma}$$

where $$\sigma = \frac{\text{air density at a given altitude}}{\text{air density at sea level}}$$

Any given aircraft cannot safely fly, at high altitude, above a certain critical Mach number M. Nor, at a lower altitude, can that aircraft safely fly at an E. A. S. exceeding a certain critical value. The invention will be explained hereinafter on the assumption that it is applied to an aircraft having a critical Mach number of 0.85, indicated by the line $V_m$ in Fig. 1, and a critical E. A. S. of 350 knots, indicated by a line $V_s$ in Fig. 1. The critical altitude for this aircraft will therefore be 24,000 feet in the International Standard Atmosphere represented by the point C of intersection of the lines $V_m$ and $V_s$.

If the pressurising system is assumed to fail at an altitude of 50,000 feet, the path of most rapid descent to a safe altitude of 18,000 feet will be represented by the line DCE. The automatic control system to be described later is accordingly so arranged that the aircraft will, in such a descent, descend at a speed $V_m$, representing a Mach number of 0.85, from 50,000 feet to the critical altitude, and will thereafter descend at an E. A. S. of 350 knots from the critical altitude to the safe altitude.

The aircraft shown in Fig. 2 comprises a pressure cabin 10, containing a seat 11 for the pilot and an automatic pilot 12 of known construction operative, through a servo-motor 13 and a connection 14, on the elevator 15. Also contained within the pressure cabin 10 is a control unit 16. This contains the whole of the mechanism contained within the framework 17, Figs. 4 and 4A, the loss of pressure switch shown in Fig. 3, the electrical Mach meter shown in Fig. 5 and a normal pressure switch NPS (Fig. 4), similar to the switch shown in Fig. 3 but arranged, when actuated, to close contact NPS₁ and open contact NPS₂ (Fig. 4) as later described.

The pressure switch LP (Fig. 3), comprises a casing 25, a micro-switch 26 and a capsule 27. So long as adequate pressure is maintained in the pressure cabin, the capsule 27 is maintained away from the micro-switch 26. On failure of the pressurising system at high altitude, however, the capsule 27 will expand, causing a member 28 at the base of the capsule to depress the plunger 29 of the microswitch, so completing a circuit between leads 130. The normal pressure switch NPS (Fig. 4) is similar to the switch LP but is arranged to actuate two contacts NPS₁, NPS₂ (Fig. 4). When the aircraft has descended to a safe altitude, under control of the automatic control system as later described, the air pressure will collapse the capsule stack (corresponding to 27) of the normal pressure switch sufficiently to close contacts NPS₁ and open contact NPS₂ as later described. Figs. 4, 4A and 5 illustrate a system of control embodying a novel form of electrical Mach meter. This system is applied to the automatic pilot 12 which is of the rate/rate type, i. e. one in which, when under normal pilot's control, the rate of application of a dive or climb signal to the elevator control is determined by the amount of movement applied by the pilot's control member. Such an automatic pilot is described in British Patent No. 611,037. The electrical Mach meter is in control of the automatic pilot 12 during the whole of the descent to a safe altitude, the altitude responsive portion of the meter being disabled below the critical altitude so that the signals given by the instrument are thereafter representative of E. A. S.

The electrical Mach meter is shown, in circuit form, in the frame 17 in Figs. 4 and 4A, from which certain parts of the conventional automatic pilot 12 unnecessary for the understanding of the invention have been omitted. A three phase supply is connected, via a transformer 58 (Fig. 4A), to lines 59, 60, 61. The line 61 is connected to the reference control winding RP of the two phase pitch motor PM of the automatic pilot, and the windings 59, 60 are alternatively connectable, either by the pilot's controller potentiometer PCP or by the Mach meter potentiometer MMP, to the control winding C of the pitch motor. The pitch motor PM is effective to rotate, through gearing 30 and about its pitch axis 31, a tilting platform 32 carrying a gyroscope 33 which, in turn, controls the elevator 15 through the servo mechanism 13, as explained in British Patent No. 611,037 so as to maintain the aircraft flying at an attitude determined by the pitch motor PM.

Normally the elevator control servo motor 13 of the automatic pilot will maintain the aircraft in level flight. The pilot, however, by actuating a switch 20 (Figs. 2 and 4A) can energize a relay PCR, by connecting the same through line 40 to a positive supply line 78, to close contacts PCR1 and PCR2, thereby connecting the potentiometer PCP to the supply lines 59, 60. His elevator control 21 (Fig. 2) is connected to a wiper 62 and, by moving this wiper on to the left hand section of the potentiometer PCP he can connect the winding C to the supply line 59. This tilts the platform of the pitch motor PM in the direction to apply a dive signal to the elevator control servo motor 13. When, on the other hand, the wiper 62 is moved on to the right hand section of the potentiometer PCP, the winding C is connected to the supply line 60, so tilting the platform 31 of the pitch motor PM in the opposite direction to apply a climb signal to the elevator control servo motor 13.

Turning now to Fig. 5, the Mach meter comprises a pair of stacks of capsules 63, 64 disposed respectively in housings 65, 66. The interior of the housing 65 is subject to dynamic air pressure through a Pitot connection 67, so that the capsule stack 63 is responsive to airspeed. The interior of the housing 66 is subject through an inlet 166 to atmospheric pressure, so that the capsule stack 64 is responsive to altitude. The capsule stack 63 is connected, by a rod 68 to a transmitter, comprising two resistances 69; 69A (Fig. 4A) and a step switch having wipers 70, 70A, disposed in the upper portion 71 of the housing 65. The capsule stack 64 is connected, by a rod 72, to a similar transmitter located in the upper portion 73 of the housing 66 and comprising two resistances 74, 74A (Fig. 4A) and a step switch having wipers 75, 75A. The altitude responsive capsule stack 64 contains a stop 76 which is adjustable by means of a screw threaded portion 77 thereof. When the aircraft has descended to a given altitude, further collapse of the capsule stack 64 is prevented by the stop 76.

Returning to Fig. 4, reduction of the pressure in the cabin to an unsafe level while the aircraft is at a dangerous altitude causes the above-described pressure switch LP to close a contact LP1. This completes a circuit from the line 78, which is connected to a positive source of supply when the automatic pilot is switched on, to earth through a loss of pressure relay LPR. This then actuates five contacts. Closure of contact LPR1 prepares a holding circuit for the relay LPR which will be effective to maintain the relay LPR energized in the event of contact LP1 reopening. Opening of contact LPR2 de-energizes a relay ML, thereby releasing a magnetic latch ML₁ (Fig. 4A) for a contact LS2 of a level flight switch. Normally the magnetic latch ML₁ holds the contact LS₂ closed as shown in Fig. 4A but when the latch ML₁ is released the contact LS2 is free to open. Closure of contact LPR3 energizes a change over relay COR. Closure of contact LPR5 energises a relay TA, thereby causing an actuator 44 to move engine throttle controls 45 in throttle closing direction to a predetermined position. Closure of contact LPR7 energises a master relay MR, through a control switch CS which is spring loaded to the closed position by a spring 34.

The change over relay COR actuates four contacts. Closure of contact COR1 establishes a holding circuit for the relay COR. Closure of contact COR3 (Fig. 4A) connects the Mach meter potentiometer MMP to the control winding C of the pitch motor PM, via a normally closed contact SR2 connected to the dive section of the potentiometer. Closure of contact COR5 (Fig. 4) energises a relay DBA to cause an actuator 42 to render operative dive brakes 43 or other drag producing mechanism. Closure of contact COR7 (Fig. 4A) connects a mercury level switch MJS to the winding C of the pitch motor through the contact LS2 when the contact LS2 is closed. This connection replaces the normal connection through the contact ECR4 which has now opened. The drawing shows the automatic pilot disengaged, but contact ECR4 is open whenever the automatic pilot is engaged.

The switches LS1 and LS2 are of the mercury level type, and LS1 makes contact at say 1° of dive and LS2 at say 1° of climb. The mercury level switch MJS will not make contact until say 2° of climb or dive. When flying level both contacts LS1 and LS2 will be open. The mercury level switch MJS is only brought into normal use when the automatic pilot is first engaged. A delay of some 30 seconds ensues before full control of the servo motor 13 is obtained and the pitch motor PM would be unstable during this period. The aircraft is accordingly kept level during this period by the switch MJS after which contact ECR4 opens and normal control is applied via potentiometer PCP and switch MR4.

The master relay MR (Fig. 4) actuates 5 contacts. Closure of contact MR1 establishes a holding circuit for the relay MR. Opening of another contact MR₂ (Fig.

4A) cuts out of circuit pilot-operated relay PCR for closing the contacts PCR1 and PCR2 and so prevents the pilot from engaging his pilot's controller potentiometer PCP. Closing of contact MR3 (Fig. 4) establishes the above mentioned holding circuit for the relay LPR through the normally closed contact NPS2 and the contact LPR1 which has closed as already described. Opening of contact MR4 (Fig. 4A) disconnects the pitch motor PM from the pilot's controller potentiometer PCP. Closure of contacts MR5 and MR7 supplies power to the Mach meter potentiometer MMP.

The aircraft is now under control of the Mach meter. A dive signal is applied from the left hand wiper 75 of the potentiometer MMP, through the normally closed signal relay contact SR2 to the winding C of the pitch motor PM. The resistances 69, 69A and 74, 74A are so arranged that the potential of the left hand wiper 75 varies inversely with the Mach number, with the result that the rate at which the dive signal is applied will be slower the higher the Mach number. In response to the dive signal, the platform of the gyroscope of the pitch motor PM is tilted into a position such that the elevator is set appropriately for a dive. When the dive commences, the level flight switch closes contact LS1.

The speed responsive capsule stack 63 actuates a further wiper 79 which moves over a set of contacts 80 and the altitude responsive capsule stack 64 actuates a similar further wiper 81 moving over a set of contacts 82. Each of the contacts 80 represents a definite range of E. A. S. and each of the contacts 82 represents a definite range of altitude. So long as either of the wipers 79, 81 occupies a space between adjoining contacts of the associated bank, the aircraft continues to dive at increasing Mach number. At a predetermined Mach number, however, which is determined by the width and spacing of the contacts 80, 82, which are suited to the design of the aircraft, both wipers 79, 81 will make contact with one of their associated contacts 80, 82. This results in energization of a relay VS to close a switch VS1 (Fig. 4). A circuit is then completed to energise a signal relay SR, thereby opening contacts SR2 and closing contact SR1 (Fig. 4A). This removes the dive signal from the pitch motor PM and substitutes a climb signal derived from the right hand section of the potentiometer MMP. This reverses the pitch motor PM and sets the elevator to lessen the dive. As soon as one of the wipers 79, 81 leaves its respective switch, the contact VS1 will open again, and the signal relay SR will change over its contacts SR1, SR2 to the position shown in Fig. 4A and again apply the dive signal. The aircraft will thus dive at a Mach number approximating the critical Mach number.

When the aircraft reaches the critical altitude, the stop 76 (Fig. 5) becomes effective, and the wiper 81 (Fig. 4A) remains on the appropriate contact 82. The Mach meter thenceforth operates as an E. A. S. meter controlling the dive through the switch VS1 so that the aircraft thereafter dives at an E. A. S. approximating to the critical E. A. S.

The dive continues until the aircraft has reached a safe altitude. The normal pressure switch NPS then closes contact NPS1 and opens contact NPS2. Opening of contact NPS2 de-energises the relay LPR, and closure of contact NPS1 operates the signal relay SR. This reverses the position of the contacts SR1, SR2 and applies a climb signal to the pitch motor PM. This signal continues until the level flight switch opens the contact LS1, to remove the climb signal, and closes the contact LS2, which is then held closed by the magnetic latch ML, which is now able to lock the contact LS2 in the closed position; since contact LPR2 has now closed and re-energized the relay ML. The pitch motor PM is now in the level flight position and thenceforth is monitored by the mercury level switch MJS, through contacts LS2 and COR7, to keep the aircraft in straight and level flight.

When the pilot desires to restore control to the pilot's controller potentiometer PCP, he can do so by opening the switch CS, thereby de-energising the relays COR and MR and closing the contact MR2 in the circuit for operating the contacts PCR1 and PCR2.

The advantages of governing the rate of descent as described above may be summarised as follows:

(a) Diving, during the first stage, at the critical Mach number ensures the minimum possible delay, consistent with safety in reaching a safe altitude, is more rapid than rates of descent governed by permitted constant airspeed or constant permitted aircraft attitude, and ensures that maximum advantage may be taken of the extra drag associated with compressibility effects.

(b) No previous knowledge of the change of elevator trim with height and speed are required as the automatic pilot will cater for these automatically. This disposes of the disadvantages of a device which pre-sets the elevator controls to what is believed to be a suitable position, but which, due to the nature of the compressibility effects and possible damage from enemy action, is not in fact correct.

What we claim as our invention and desire to secure by Letters Patent is:

1. In an aircraft, including an elevator, a pressure cabin, an automatic pilot, and an operative connection between the automatic pilot and the elevator, the combination with said automatic pilot of a pressure sensitive device exposed to the pressure within the pressure cabin, normally ineffective dive controlling means operable on said automatic pilot to maintain the aircraft in diving flight at a substantially constant Mach number, means actuable by said pressure sensitive device, on failure of pressure in said cabin above a critical altitude, for placing the automatic pilot under control of said dive controlling means for actuation thereby, means operating automatically, when the aircraft has descended to an altitude near said critical altitude, to render said dive controlling means thereafter effective to constrain the automatic pilot to maintain the aircraft in diving flight at a substantially constant equivalent airspeed, and means responsive to further descent of the aircraft to a predetermined altitude for disconnecting said dive controlling means from said automatic pilot.

2. In an aircraft, a combination as claimed in claim 1, comprising normally ineffective drag producing means, and means actuable by the pressure sensitive device, on failure of pressure in the cabin above the critical altitude, to render said drag producing means effective.

3. In an aircraft, a combination as claimed in claim 1, comprising an engine throttle control and means actuable by the pressure sensitive device, on failure of pressure in the cabin above the critical altitude, to move said engine throttle control in throttle closing direction.

4. In an aircraft, including an elevator, a pressure cabin, an automatic pilot, and an operative connection between the automatic pilot and the elevator, the combination with said automatic pilot of a pressure sensitive device exposed to the pressure within the pressure cabin, a normally ineffective electrical Mach meter having two sections and operable on said automatic pilot to maintain the aircraft in diving flight at a substantially constant Mach number, one section of said Mach meter being responsive to equivalent air speed and the other section of said Mach meter being responsive to altitude means actuable by said pressure sensitive device, on failure of pressure in said cabin above a critical altitude, for placing the automatic pilot under control of both sections of said Mach meter for actuation thereby, means operating automatically, when the aircraft has descended to an altitude near said critical altitude, to disable said altitude responsive section of said Mach meter thereby enabling the other section of said Mach meter to constrain the automatic pilot to maintain the aircraft in diving flight at a substantially constant equivalent air-speed, and means responsive to further descent of the aircraft to a predetermined altitude below said critical altitude for disconnecting said Mach meter from said automatic pilot.

5. In an aircraft, including an elevator, a pressure cabin, an automatic pilot, and an operative connection between the automatic pilot and the elevator, the combination with said automatic pilot of a pressure sensitive device exposed to the pressure within the pressure cabin, a first potentiometer normally connected to the automatic pilot and manually operable to apply dive and climb signals to the automatic pilot; a second potentiometer, normally inoperative connections between said second potentiometer and said automatic pilot for applying dive and climb signals to the automatic pilot when operative, an electrical relay system, a switch operable by said pressure sensitive device on failure of pressure in said cabin above a critical altitude to cause said relay system to disconnect the first potentiometer from the automatic pilot and to render operative the dive signal transmitting connection between the second potentiometer and the automatic pilot, a Mach meter for periodically rendering said climb signal transmitting connection operative in place of said dive signal transmitting connection and thereby maintaining the aircraft in diving flight at a substantially constant Mach number, said Mach meter comprising sections responsive respectively to equivalent air speed and to altitude means responsive to descent of the aircraft to an altitude near the critical altitude for disabling the altitude responsive section of said Mach meter rendering said meter responsive to airspeed instead of to Mach number, said meter thereafter controlling the alternative establishment of said connections to maintain the aircraft in diving flight at a substantially constant equivalent airspeed, and means responsive to further descent of the aircraft to a predetermined altitude below said critical altitude for causing said relay system to disconnect the automatic pilot from the second potentiometer.

6. In an aircraft, including an elevator, a pressure cabin, an automatic pilot, and an operative connection between the automatic pilot and the elevator, the combination with said automatic pilot of a pressure sensitive device exposed to the pressure within the pressure cabin, a first potentiometer normally connected to the automatic pilot and manually operable to apply dive and climb signals to the automatic pilot, a second potentiometer, normally inoperative connections between said second potentiometer and said automatic pilot for applying dive and climb signals to the automatic pilot when operative, an electrical relay system, a switch operable by said pressure sensitive device on failure of pressure in said cabin above a critical altitude to cause said relay system to disconnect the first potentiometer from the automatic pilot and to render operative the dive signal transmitting connection between the second potentiometer and the automatic pilot, a Mach meter for periodically rendering said climb signal transmitting connection operative in place of said dive signal transmitting connection and thereby maintaining the aircraft in diving flight at a substantially constant Mach number, said Mach meter comprising sections responsive respectively to equivalent air speed and to altitude means responsive to descent of the aircraft to an altitude near the critical altitude for disabling the altitude responsive section of the Mach meter and thereby rendering said Mach meter responsive to airspeed instead of to Mach number, said means thereafter controlling the alternative establishment of said connections to maintain the aircraft in diving flight at a substantially constant equivalent airspeed, a second pressure sensitive device, a switch operable thereby on further descent of the aircraft to a predetermined safe altitude to establish the climb signal transmitting connection between the second potentiometer and the automatic pilot, a level flight switch mechanism for rendering said climb signal transmitting connection inoperative when the aircraft has attained level flight, and a further level flight switch for thereafter monitoring the automatic pilot to maintain the aircraft in level flight.

7. In an aircraft, including an elevator, a pressure cabin, an automatic pilot, and an operative connection between the automatic pilot and the elevator, the combination with said automatic pilot of a pressure sensitive member exposed to the pressure within the pressure cabin, a normally ineffective electrical Mach meter, comprising a first pressure sensitive device exposed to dynamic air pressure, a second pressure sensitive device exposed to atmospheric pressure, a potentiometer system including sections for respectively applying a dive signal and a climb signal to the automatic pilot, and wipers actuated by said first and second pressure sensitive devices and respectively cooperating with the dive and climb sections of the potentiometer system, means actuable by said pressure sensitive member, on failure of pressure in the cabin above a critical altitude, to connect to said automatic pilot the wiper coacting with the dive section of the potentiometer system, thereby causing the aircraft to dive, a switch, switch actuating means controlled by said first and second pressure sensitive devices for periodically actuating said switch to connect to the autopilot the wiper coacting with the climb section of the potentiometer sysem in place of the wiper coacting with the dive section of the potentiometer system, thereby maintaining the aircraft in diving flight at a substantially constant Mach number, a stop for arresting further movement of said second pressure sensitive device when the aircraft has descended to an altitude near the critical altitude and thereby modifying the action of said switch controlling means, said switch controlling means thereafter maintaining the aircraft in diving flight at a substantially constant equivalent airspeed, and means responsive to further descent of the aircraft to a predetermined altitude below said critical altitude for disconnecting said potentiometer system from said automatic pilot.

8. In an aircraft, a combination as claimed in claim 7, wherein said switch controlling means comprises a first step switch actuated by the first pressure sensitive device and having contacts each of which is representative of a definite range of equivalent airspeed, a second step switch actuated by the second pressure sensitive device and having contacts each of which is representative of a definite range of altitude, and a relay operative, so long only as contacts are simultaneouly made by both step switches, to cause said switch to connect to the automatic pilot the wiper associaed with the climb section of the potentiometer.

References Cited in the file of this patent

UNITED STATES PATENTS

| 2,167,077 | Köster | July 25, 1939 |
| 2,176,817 | Jacobson et al. | Oct. 17, 1939 |
| 2,342,184 | Fawcett | Feb. 22, 1944 |
| 2,512,790 | Cleveland | June 27, 1950 |
| 2,597,892 | Nash | May 27, 1952 |

FOREIGN PATENTS

| 615,451 | Great Britain | Jan. 6, 1949 |
| 655,172 | Great Britain | July 11, 1951 |